United States Patent
Kovach

(10) Patent No.: US 11,638,393 B2
(45) Date of Patent: May 2, 2023

(54) GROUND ENGAGING TOOL MONITORING SYSTEM

(71) Applicant: CNH Industrial America LLC, New Holland, PA (US)

(72) Inventor: Michael George Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 431 days.

(21) Appl. No.: 16/830,344

(22) Filed: Mar. 26, 2020

(65) Prior Publication Data

US 2021/0298222 A1    Sep. 30, 2021

(51) Int. Cl.
*A01B 63/00* (2006.01)
*A01B 49/02* (2006.01)
(Continued)

(52) U.S. Cl.
CPC .......... *A01B 63/008* (2013.01); *A01B 49/027* (2013.01); *A01B 63/22* (2013.01);
(Continued)

(58) Field of Classification Search
CPC ... A01B 49/027; A01B 63/002; A01B 63/008; A01B 63/111; A01B 63/1112;
(Continued)

(56) References Cited

U.S. PATENT DOCUMENTS

| 3,642,087 A | 2/1972 | Sampey |
| 4,413,685 A | 11/1983 | Gremelspacher et al. |

(Continued)

FOREIGN PATENT DOCUMENTS

| CN | 105379453 A | * 3/2016 | ............ A01B 35/02 |
| CN | 105783839 | 7/2016 | |

(Continued)

OTHER PUBLICATIONS

EP Application No. 21165022.1, Search Report dated Aug. 6, 2021, 8 pgs.

(Continued)

*Primary Examiner* — David A Testardi
(74) *Attorney, Agent, or Firm* — Rebecca Henkel; Rickard DeMille

(57) ABSTRACT

An agricultural implement includes a frame and a ground engaging tool assembly having a shank rotatably coupled to the frame and a ground engaging tool coupled to the shank. In addition, the agricultural implement includes a monitoring system having a sensor mounted to one of the frame or the ground engaging tool assembly and directed toward a target. The target is the other of the frame or the ground engaging tool assembly, and the sensor is configured to emit an output signal toward the target and to receive a return signal indicative of a measured position of the ground engaging tool assembly relative to the frame. The monitoring system also includes a controller configured to determine that the ground engaging tool assembly is in a deflected position in response to determining that a difference between the measured position and a working position is greater than a threshold value.

20 Claims, 3 Drawing Sheets

(51) Int. Cl.
  *A01B 63/22*  (2006.01)
  *G01B 7/02*   (2006.01)
  *G01S 13/08*  (2006.01)
  *G01S 15/08*  (2006.01)
  *G01S 17/08*  (2006.01)

(52) U.S. Cl.
  CPC ............. *G01B 7/023* (2013.01); *G01S 13/08* (2013.01); *G01S 15/08* (2013.01); *G01S 17/08* (2013.01)

(58) Field of Classification Search
  CPC ... A01B 63/114; A01B 63/1145; A01B 63/22; A01B 63/32; A01B 79/005; B60W 2300/15; G05D 2201/0201; E02F 9/264
  See application file for complete search history.

(56) References Cited

U.S. PATENT DOCUMENTS

| | | | |
|---|---|---|---|
| 4,444,271 A * | 4/1984 | Dietrich, Sr. | A01B 21/086 172/468 |
| 4,491,183 A | 1/1985 | Anderson et al. | |
| 4,600,060 A * | 7/1986 | Winter | A01B 63/32 172/4 |
| 4,679,633 A | 7/1987 | Kauss | |
| 4,775,940 A * | 10/1988 | Nishida | A01B 63/1112 701/50 |
| 4,776,153 A | 10/1988 | DePauw et al. | |
| 5,060,205 A | 10/1991 | Phelan | |
| 5,425,318 A * | 6/1995 | Keeton | A01C 5/066 111/197 |
| 5,430,651 A | 7/1995 | Nielsen et al. | |
| 5,488,817 A | 2/1996 | Paquet et al. | |
| 5,535,577 A | 7/1996 | Chmielewski et al. | |
| 5,621,666 A | 4/1997 | O'Neall et al. | |
| 5,711,139 A | 1/1998 | Swanson | |
| 5,794,421 A | 8/1998 | Maichle | |
| 6,076,611 A | 6/2000 | Rozendaal et al. | |
| 6,089,327 A | 7/2000 | Kimura et al. | |
| 6,131,919 A | 10/2000 | Lee et al. | |
| 6,164,385 A | 12/2000 | Buchi | |
| 6,216,794 B1 | 4/2001 | Buchi | |
| 6,222,628 B1 | 4/2001 | Gorallo et al. | |
| 6,305,478 B1 | 10/2001 | Friggstad | |
| 6,588,187 B2 | 7/2003 | Englestad et al. | |
| 6,698,524 B2 | 3/2004 | Bernhardt et al. | |
| 6,813,873 B2 | 11/2004 | Allwörden et al. | |
| 6,990,390 B2 | 1/2006 | Groth et al. | |
| 7,028,554 B2 | 4/2006 | Adamchuk et al. | |
| 7,063,167 B1 | 6/2006 | Staszak et al. | |
| 7,540,129 B2 | 6/2009 | Kormann | |
| 7,540,130 B2 | 6/2009 | Coers et al. | |
| 7,748,264 B2 | 7/2010 | Prem | |
| 7,866,671 B2 | 1/2011 | Madler | |
| 7,870,709 B2 | 1/2011 | Digman | |
| 8,573,319 B1 | 11/2013 | Casper et al. | |
| 8,720,170 B2 | 5/2014 | Deneault et al. | |
| 8,751,147 B2 | 6/2014 | Colwell | |
| 8,752,642 B2 | 6/2014 | Whalen et al. | |
| 8,827,001 B2 | 9/2014 | Wendte et al. | |
| 8,843,283 B2 | 9/2014 | Strelioff et al. | |
| 8,857,530 B2 | 10/2014 | Henry | |
| RE45,303 E | 12/2014 | Henry et al. | |
| 8,977,441 B2 | 3/2015 | Grimes et al. | |
| 9,026,321 B2 | 5/2015 | Henry et al. | |
| 9,301,439 B2 | 4/2016 | Gilstring | |
| 9,351,443 B2 | 5/2016 | Miller et al. | |
| 9,405,039 B2 | 8/2016 | Anderson | |
| 9,481,294 B2 | 11/2016 | Sauder et al. | |
| 9,510,498 B2 | 12/2016 | Tuttle et al. | |
| 9,516,802 B2 | 12/2016 | Zemenchik | |
| 9,554,098 B2 | 1/2017 | Casper et al. | |
| 9,554,504 B2 | 1/2017 | Houck | |
| 9,585,298 B2 | 3/2017 | Henry et al. | |
| 9,585,307 B2 | 3/2017 | Holland | |
| 9,693,496 B2 | 7/2017 | Tevs et al. | |
| 9,706,696 B2 | 7/2017 | Gschwendtner | |
| 9,750,174 B2 | 9/2017 | Sauder et al. | |
| 9,801,329 B2 | 10/2017 | Zielke | |
| 9,861,022 B2 | 1/2018 | Bassett | |
| 9,980,422 B2 | 5/2018 | Czaoka et al. | |
| 10,045,474 B2 | 8/2018 | Bachman et al. | |
| 10,104,822 B2 | 10/2018 | Man | |
| 10,123,475 B2 | 11/2018 | Posselius et al. | |
| 10,178,823 B2 | 1/2019 | Kovach et al. | |
| 10,219,421 B2 | 3/2019 | Achen et al. | |
| 10,820,476 B2 | 11/2020 | Stoller et al. | |
| 2010/0017075 A1 | 1/2010 | Beajuot | |
| 2011/0036281 A1 * | 2/2011 | Beaujot | A01B 63/22 367/99 |
| 2012/0227992 A1 * | 9/2012 | Henry | A01B 63/114 172/4 |
| 2013/0068489 A1 | 3/2013 | Blunier et al. | |
| 2015/0129251 A1 * | 5/2015 | Sudbrink | A01B 63/22 172/1 |
| 2015/0129255 A1 * | 5/2015 | Sudbrink | A01B 63/16 172/311 |
| 2016/0029547 A1 | 2/2016 | Casper et al. | |
| 2017/0064900 A1 | 3/2017 | Zemenchik | |
| 2017/0105331 A1 | 4/2017 | Herlitzius et al. | |
| 2017/0251587 A1 * | 9/2017 | Sporrer | A01B 15/14 |
| 2017/0359941 A1 * | 12/2017 | Czapka | A01B 59/042 |
| 2018/0114305 A1 | 4/2018 | Strnad et al. | |
| 2018/0153088 A1 * | 6/2018 | Sporrer | A01B 49/065 |
| 2018/0206393 A1 * | 7/2018 | Stoller | A01B 79/005 |
| 2018/0220577 A1 | 8/2018 | Posselius et al. | |
| 2018/0279541 A1 * | 10/2018 | Kovach | A01B 76/00 |
| 2018/0279542 A1 * | 10/2018 | Kovach | A01B 63/28 |
| 2018/0279543 A1 * | 10/2018 | Kovach | A01B 71/02 |
| 2018/0299422 A1 | 10/2018 | Pregesbauer | |
| 2018/0303022 A1 * | 10/2018 | Barrick | A01B 76/00 |
| 2018/0310465 A1 * | 11/2018 | Peterson | A01B 49/027 |
| 2018/0310466 A1 * | 11/2018 | Kovach | G01D 5/12 |
| 2018/0340845 A1 | 11/2018 | Rhodes et al. | |
| 2019/0008088 A1 | 1/2019 | Posselius et al. | |
| 2019/0059198 A1 | 2/2019 | Schnaider et al. | |
| 2019/0150350 A1 * | 5/2019 | Engel | A01C 7/203 |
| 2019/0235529 A1 * | 8/2019 | Barrick | A01B 63/14 |
| 2019/0246548 A1 * | 8/2019 | Kovach | A01B 3/24 |
| 2019/0254223 A1 * | 8/2019 | Eichhorn | A01B 63/16 |
| 2020/0000005 A1 * | 1/2020 | Stanhope | A01B 35/26 |
| 2020/0060062 A1 | 2/2020 | Sporrer et al. | |
| 2020/0084954 A1 * | 3/2020 | Sporrer | A01B 49/027 |
| 2020/0093052 A1 | 3/2020 | Preimess et al. | |
| 2020/0100419 A1 | 4/2020 | Stanhope | |
| 2020/0232792 A1 * | 7/2020 | Swanson | G01B 17/00 |
| 2020/0337206 A1 | 10/2020 | Hertzog et al. | |
| 2020/0352088 A1 * | 11/2020 | Arnett | A01C 7/203 |
| 2021/0045280 A1 | 2/2021 | Ehlert et al. | |
| 2021/0068331 A1 * | 3/2021 | Sporrer | A01B 63/16 |
| 2021/0092892 A1 | 4/2021 | Pregesbauer | |

FOREIGN PATENT DOCUMENTS

| | | | |
|---|---|---|---|
| CN | 109588075 | 4/2019 | |
| DE | 3827618 A1 * | 2/1990 | ............ A01B 63/32 |
| DE | 102017112224 A1 * | 12/2018 | ............ A01C 5/064 |
| EP | 1273216 | 1/2003 | |
| EP | 1273216 A1 * | 1/2003 | ............ A01B 63/32 |
| EP | 3305052 | 4/2018 | |
| JP | H02167004 | 6/1990 | |
| JP | 2969808 | 11/1999 | |
| JP | H11321634 | 11/1999 | |
| JP | 2002165510 | 6/2002 | |
| JP | 2005095045 | 4/2005 | |
| WO | 2017158006 | 9/2017 | |
| WO | WO2017197274 | 11/2017 | |
| WO | WO2018018050 | 1/2018 | |
| WO | WO-2018018050 A1 * | 1/2018 | ............ A01C 5/064 |
| WO | 2019158454 | 8/2019 | |

(56) References Cited

OTHER PUBLICATIONS

EP Application No. 21165029.6, Search Report dated Aug. 6, 2021, 7 pgs.
EP Application No. 21165028.8, Search Report dated Aug. 9, 2021, 14 pgs.
EP Application No. 21165025.4, Search Report dated Aug. 6, 2021, 9 pgs.
EP Application No. 21165028.8 Extended Search Report, dated Dec. 10, 2021, 13 pgs.
EP Application No. 19171136.5 Extended European Search Report dated Nov. 6, 2019, 22 pgs.
Gilliot et al., "Soil Surface Roughness Measurement: A New Fully Automatic Photogrammetric Approach Applied To Agricultural Bare Fields," Computers and Electronics in Agriculture, Jan. 23, 2017, pp. 63-78, Elsevier, https://www.researchgate.net/publication/312651105_Soil_surface_roughness_measurement_A_new_fully_automatic_photogrammetric_approach_applied_to_agricultural_bare_fields.
Hart-Carter Co., "Automatic Header Adjustment," Farm Show Magazine, 1984, p. 33, vol. #8, Issue #6.
Raper et al., "A Portable Tillage Profiler for Measuring Subsoiling Disruption," American Society of Agricultural Engineers, 2004, pp. 23-27, vol. 47(1), https://www.ars.usda.gov/ARSUserFiles/60100500/csr/ResearchPubs/raper/raper_04a.pdf.
Yasin et al., "Non-Contact System for Measuring Tillage Depth," Computers and Electronics in Agriculture, 1992, pp. 133-147, https://www.researchgate.net/publication/229318888_Non-contact_system_for_measuring_tillage_depth.
Peteinatos et al., "Precision Harrowing With a Flexible Tine Harrow and an Ultrasonic Sensor," Jul. 2015, Precision Agricultural, pp. 579-586, https://www.researchgate.net/publication/281437517_Precision_harrowing_with_a_lexible_tine_harrow_and_an_ultrasonic_sensor.
"Tiger-Mate® 255 Field Cultivator," 2017, Case IH Agriculture, 24 pgs.
"Ecolo-Tiger® 875 Disk Ripper," 2018, Case IH Agriculture, 16 pgs.
U.S. Appl. No. 16/830,531, filed Mar. 26, 2020, Michael George Kovach.
U.S. Appl. No. 16/830,331, filed Mar. 26, 2020, Michael George Kovach.
U.S. Appl. No. 16/830,335, filed Mar. 26, 2020, Michael George Kovach.
U.S. Appl. No. 16/830,373, filed Mar. 26, 2020, Michael George Kovach.
U.S. Appl. No. 16/830,410, filed Mar. 26, 2020, Michael George Kovach.

* cited by examiner

GROUND ENGAGING TOOL MONITORING SYSTEM

BACKGROUND

The present disclosure relates generally to a ground engaging tool monitoring system.

Certain agricultural implements include ground engaging tools configured to interact with the soil. For example, a tillage implement may include tillage points and/or disc blades configured to break up the soil for subsequent planting or seeding operations. During tillage operations, one or more ground engaging tools (e.g., tillage points) may move from a working position to a deflected position in response to contact with harder and/or more dense soil. Unfortunately, movement of the ground engaging tool(s) from the working position to the deflected position may substantially reduce the performance of the ground engaging tool(s) (e.g., the tilling effectiveness of the ground engaging tool(s) may be substantially reduced).

BRIEF DESCRIPTION

In certain embodiments, an agricultural implement includes a frame and a ground engaging tool assembly having a shank rotatably coupled to the frame and a ground engaging tool coupled to the shank. The ground engaging tool is configured to engage soil. The agricultural implement also includes a biasing element coupled to the frame and to the shank, in which the biasing element is configured to urge the ground engaging tool assembly toward a working position. In addition, the agricultural implement includes a monitoring system having a sensor mounted to one of the frame or the ground engaging tool assembly and directed toward a target. The target is the other of the frame or the ground engaging tool assembly, and the sensor is configured to emit an output signal toward the target and to receive a return signal indicative of a measured position of the ground engaging tool assembly relative to the frame. The monitoring system also includes a controller communicatively coupled to the sensor. The controller includes a memory and a processor, the controller is configured to determine that the ground engaging tool assembly is in a deflected position in response to determining that a difference between the measured position and the working position is greater than a threshold value, and the controller is configured to output a monitoring signal indicative of the ground engaging tool assembly being in the deflected position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
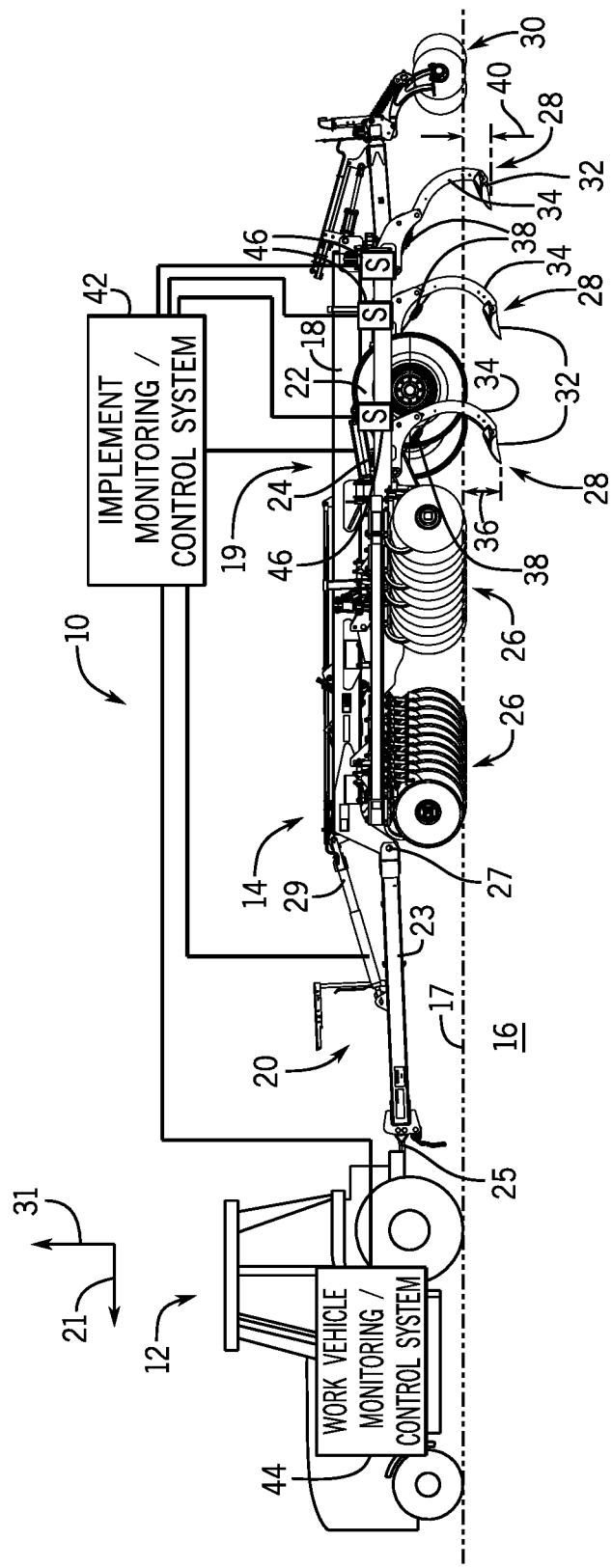
FIG. 1 is a side view of an embodiment of an agricultural system having a work vehicle and an agricultural implement.

Turning to the drawings, FIG. 1 is a side view of an embodiment of an agricultural system 10 having a work vehicle 12 and an agricultural implement 14. In the illustrated embodiment, the agricultural implement 14 is a primary tillage implement having multiple ground engaging tool assemblies configured to till soil 16. As illustrated, the agricultural implement 14 includes a frame 18 and a hitch assembly 20 coupled to the frame 18. The hitch assembly 20 is configured to couple to the work vehicle 12 (e.g., tractor or other prime mover), and the work vehicle 12 is configured to tow the agricultural implement 14 through a field along a direction of travel 21. In the illustrated embodiment, the agricultural implement 14 includes wheels 22 configured to engage the surface 17 of the soil 16 and to support at least a portion of the agricultural implement 14. In addition, the agricultural implement 14 includes wheel actuator(s) 24 configured to move the wheels 22 from the illustrated raised position to a lowered position. While the wheels 22 are in the illustrated raised position, ground engaging tool assemblies of the agricultural implement 14 engage the soil 16. As the agricultural implement 14 is towed through the field, the ground engaging tool assemblies condition the soil and/or residue disposed on the surface of the soil for subsequent planting or seeding operations. The wheel actuator(s) 24 may lower the wheels 22 from the illustrated raised position to the lowered position. As a result, the ground engaging tool assemblies are disengaged from the soil 16 to facilitate transport of the agricultural implement 14 (e.g., between successive rows of the field).

In certain embodiments, each wheel is part of a respective wheel assembly 19 which includes a wheel frame. The wheel frame may be pivotally coupled to the implement frame 18, thereby facilitating adjustment of the vertical position of each wheel 22. In other embodiments, the wheel frame may be movably coupled to the implement frame by another suitable connection (e.g., sliding connection, linkage assembly, etc.) that facilitates adjustment of the vertical position of the respective wheel. In certain embodiments, the agricultural implement includes two wheel assemblies, and each wheel assembly includes a single respective wheel. However, in other embodiments, the agricultural implement may include more or fewer wheel assemblies (e.g., 1, 2, 3, 4, 5, 6, or more). In addition, each wheel assembly may include any suitable number of wheels (e.g., 1, 2, 3, 4, 5, 6, or more).

In certain embodiments, the agricultural implement 14 includes multiple wheel actuators 24, and each wheel actuator 24 is coupled to the implement frame 18 and to the wheel frame of a respective wheel assembly. Each wheel actuator 24 is configured to control a position of the wheel assembly relative to the implement frame 18 along a vertical axis 31. For example, each wheel actuator 24 may control a vertical position of a respective wheel 22 relative to the implement frame 18. In certain embodiments, a single wheel actuator may be coupled to each respective wheel assembly. However, in other embodiments, a single wheel actuator may be coupled to multiple wheel assemblies, and/or multiple wheel actuators may be coupled to at least one wheel assembly.

In the illustrated embodiment, the hitch assembly 20 includes a hitch frame 23 and a hitch 25. The hitch frame 23 is pivotally coupled to the implement frame 18 via pivot joint(s) 27, and the hitch 25 is configured to couple to a corresponding hitch of the work vehicle 12. While the hitch frame 23 is pivotally coupled to the implement frame 18 in the illustrated embodiment, in other embodiments, the hitch frame may be movably coupled to the implement frame by a linkage assembly (e.g., four bar linkage assembly, etc.) or another suitable assembly/mechanism that enables the hitch to move vertically relative to the implement frame.

In the illustrated embodiment, the agricultural implement 14 includes a hitch actuator 29 coupled to the implement frame 18 and to the hitch frame 23 of the hitch assembly 20. The hitch actuator 29 is configured to control a position of the hitch 25 of the hitch assembly 20 relative to the implement frame 18 along the vertical axis 31. While the agricultural implement 14 includes a single hitch actuator 29 in the illustrated embodiment, in other embodiments, the agricultural implement may include more hitch actuators extending between the implement frame and the hitch frame. Furthermore, while the hitch actuator 29 is coupled to the hitch frame 23 in the illustrated embodiment, in other embodiments, the hitch actuator may be coupled directly to the hitch or another suitable element of the hitch assembly.

In the illustrated embodiment, the agricultural implement 14 includes disc blades 26, tillage point assemblies 28, and finishing discs 30. The disc blades 26 are configured to engage a top layer of the soil. As the agricultural implement 14 is towed through the field, the disc blades 26 are driven to rotate, thereby breaking up the top layer and sizing residue on the surface of the field. In the illustrated embodiment, the disc blades 26 are arranged in two rows. However, in alternative embodiments, the disc blades may be arranged in more or fewer rows (e.g., 1, 2, 3, 4, 5, 6, or more). In addition, the angle of each row may be selected and/or controlled to control the interaction of the disc blades 26 with the top layer of soil. For example, the disc blades may be arranged in one or more gangs, and an actuator (e.g., hydraulic cylinder, linear actuator, etc.) may adjust the angle of each gang relative to the direction of travel of the agricultural implement. The tillage point assemblies 28 are configured to engage the soil at a greater depth, thereby breaking up a lower layer of the soil 16. In the illustrated embodiment, each tillage point assembly 28 includes a tillage point 32 and a shank 34. The shank 34 is configured to position the tillage point 32 at a target depth 36 beneath the soil surface, and the tillage point 32 is configured to break up the soil 16. The shape of each tillage point, the arrangement of the tillage point assemblies, and the number of tillage point assemblies may be selected to control tillage within the field. Furthermore, as the agricultural implement 14 is towed through the field, the finishing discs 30 are driven to rotate, thereby sizing soil clods, leveling the soil surface, smoothing the soil surface, destroying weeds, cutting residue on the soil surface, or a combination thereof.

In the illustrated embodiment, a biasing element, such as the illustrated spring 38, extends between the frame 18 (e.g., a mounting bracket of the frame) and the shank 34 of each tillage point assembly 28. The spring 38 is configured to urge the tillage point assembly 28 toward the working position (e.g., in which the tillage point is positioned at the target depth). As the agricultural implement moves through the field, the soil 16 may apply a force to the tillage point assembly 28 greater than the force applied by the spring 38 (e.g., due to contact with an obstruction, an increase in soil density and/or hardness, an increase in speed of the agricultural implement, etc.). As a result, the tillage point assembly may rotate from the working position to a deflected position. For example, if the tillage point assembly 28 contacts an obstruction, the tillage point assembly 28 may temporarily rotate to the deflected position. The spring 38 may then drive the tillage point assembly 28 from the deflected position to the working position after the tillage point assembly 28 passes the obstruction. However, in certain situations (e.g., a large deflection of the tillage point assembly, the force applied by the spring is insufficient to drive the tillage point assembly from the deflected position to the working position, etc.), the tillage point assembly 28 may remain in the deflected position (e.g., with the tip of the tillage point in contact with the soil surface) after passing the obstruction. Furthermore, if a tillage point assembly 28 encounters a region of dense and/or hard soil, as illustrated by the rear tillage point assembly, the tillage point assembly may rotate to the deflected position. Accordingly, the penetration depth 40 of the tillage point 32 is less than the target penetration depth 36. With the tillage point assembly in the deflected position (e.g., as illustrated by the rear tillage point assembly), the performance of the tillage point assembly may be reduced. While a spring 38 is coupled to each tillage point assembly 28 in the illustrated embodiment, in other embodiments, another suitable biasing element (e.g., a pneumatic cylinder, a hydraulic cylinder, a resilient material, etc.) may be coupled to at least one tillage point assembly.

In the illustrated embodiment, the agricultural implement 14 includes a monitoring/control system (e.g., the illustrated implement monitor/control system 42) configured to monitor and, in certain embodiments, control the position of the tillage point assemblies. In the illustrated embodiment, the implement monitoring/control system 42 is communicatively coupled to a work vehicle monitoring/control system 44 of the work vehicle 12, and the implement monitoring/control system 42 includes the wheel actuator(s) 24 and the hitch actuator 29. As discussed in detail below, the implement monitoring/control system 42 includes a controller configured to determine a position of at least one tillage point assembly. In certain embodiments, the controller may output a signal to a user interface (e.g., of the work vehicle monitoring/control system) indicative of the position of the at least one tillage point assembly. Furthermore, in certain embodiments, the controller may control the speed of the agricultural system and/or the position of at least one tillage point assembly in response to determining that the at least one tillage point assembly is in the deflected position. For example, the controller may output a control signal (e.g., to the work vehicle monitoring/control system 44) indicative of instructions to reduce a speed of the agricultural system 10 in response to determining that at least one tillage point assembly is in the deflected position. Additionally or alternatively, the controller may output a control signal (e.g., to the wheel actuator(s) 24 and/or to the hitch actuator 29)

indicative of instructions to raise at least one tillage point assembly to a target raised position in response to determining that the at least one tillage point assembly is in the deflected position, thereby reducing the penetration depth of the at least one tillage point assembly.

The target raised position may be below the soil surface and above the target depth. Accordingly, with the tillage points in the target raised position, the resistance provided by the soil may be substantially reduced. As such, each deflected tillage point assembly may return to the working position in response to raising the tillage points to the target raised position (e.g., raising the frame 18 of the agricultural implement 14 upwardly along the vertical axis 31 relative to the soil surface, such that the tillage point of each tillage point assembly is positioned at the target raised position while the tillage point assembly is in the working position). For example, the spring 38 may drive the rearward tillage point assembly 28 to the working position in response to raising the rearward tillage point assembly 28 to the target raised position. With the tillage point assemblies in the working position, the performance of the tillage points may be enhanced, thereby increasing the effectiveness of tilling operations.

Furthermore, reducing the speed of the agricultural system reduces the resistance provided by the soil. As such, each deflected tillage point assembly may return to the working position in response to reducing the speed of the agricultural system. For example, the spring 38 may drive the rearward tillage point assembly 28 to the working position in response to reducing the speed of the agricultural system. In certain embodiments, the controller may adjust the speed of the agricultural system, the controller may adjust the position of one or more tillage point assemblies, or a combination thereof.

In the illustrated embodiment, the implement monitoring/control system 42 also includes sensors 46 coupled to the implement frame 18. Each sensor 46 is configured to emit an output signal toward a respective tillage point assembly 28 and to receive a return signal indicative of a measured position of the respective tillage point assembly 28 relative to the implement frame. As discussed in detail below, the sensors 46 are communicatively coupled to the controller of the implement monitoring/control system, and the implement monitoring/control system controller may be configured to determine whether each tillage point assembly is in the working position or the deflected positioned based on feedback from a respective sensor. In certain embodiments, the deflected position corresponds to any position of the tillage point assembly that is more than a threshold distance from the working position (e.g., at which the tillage point of the tillage point assembly is positioned at the target depth). For example, the deflected position of the tillage point assembly may correspond to a position of the tillage point assembly that is more than 1 cm, more than 2 cm, more than 3 cm, more than 5 cm, or more than 10 cm from the working position. Accordingly, the controller may determine that the tillage point assembly is in the deflected position in response to determining that a difference between the measured position and the working position is greater than a threshold value (e.g., 1 cm, 2 cm, 3 cm, 5 cm, or 10 cm).

Each sensor may be any suitable type of sensor configured to emit an output signal toward a respective tillage point assembly and to receive a return signal indicative of a position of the tillage point assembly relative to the implement frame. In certain embodiments, at least one sensor may include an infrared sensor configured to emit an infrared signal toward the tillage point assembly and to receive a return infrared signal from the tillage point assembly. Furthermore, in certain embodiments, at least one sensor may include a radio detection and ranging (RADAR) sensor (e.g., millimeter wave (MMW) scanner, etc.) configured to emit a radio frequency signal toward the tillage point assembly and to receive a return radio frequency signal from the tillage point assembly. In addition, in certain embodiments, at least one sensor may include a lidar sensor (e.g., time-of-flight scanning laser, etc.) configured to emit a light signal toward the tillage point assembly and to receive a return light signal from the tillage point assembly. By way of further example, in certain embodiments, at least one sensor may include an ultrasonic sensor configured to emit an ultrasonic signal toward the tillage point assembly and to receive a return ultrasonic signal from the tillage point assembly. Furthermore, in certain embodiments, at least one sensor may include a capacitive sensor configured to emit an electric signal/field toward the tillage point assembly and to receive a return electric signal from the tillage point assembly (e.g., in the form of a change to the emitted electric signal/field).

In certain embodiments, the tillage point assembly may include a target element (e.g., coupled to the shank), and the sensor may be directed toward the target element, thereby enhancing the accuracy of the sensor (e.g., as compared to directing the sensor toward the shank). The target element may include an optical reflector for an infrared/lidar sensor, a RADAR reflector for a RADAR sensor, an object having a target dielectric value for a capacitive sensor, or another suitable type of target element. In the illustrated embodiment, each sensor is configured to monitor the position of a single respective tillage point assembly. However, in other embodiments, a sensor (e.g., an infrared sensor, a lidar sensor, a RADAR sensor, etc.) may be configured to monitor the position of multiple tillage point assemblies. Furthermore, while each sensor is mounted to the implement frame and directed toward a respective tillage point assembly in the illustrated embodiment, in other embodiments, at least one sensor may be mounted to a respective tillage point assembly (e.g., the shank of the respective tillage point assembly) and directed toward the implement frame. In such embodiments, the at least one sensor may emit an output signal toward the implement frame and receive a return signal indicative of a measured position of the respective tillage point assembly relative to the implement frame.

Furthermore, in certain embodiments, at least one sensor may include another suitable type of sensor (e.g., alone or in combination with one or more of the sensors described above), such as a potentiometer, one or more contact switches, a camera, a Hall effect sensor, a linear variable differential transformer (LVDT), or a combination thereof. In addition, at least one sensor may include a pressure sensor configured to monitor hydraulic or pneumatic pressure of a cylinder configured to urge the tillage point assembly toward the working position. The controller may be configured to determine the position of the tillage point assembly based on the pressure within the cylinder. While the implement monitoring/control system includes three sensors in the illustrated embodiment, in other embodiments, the implement monitoring/control system may include more or fewer sensors (e.g., 0, 1, 2, 3, 4, 5, 6, 7, 8, 9, 10, or more). For example, the implement monitoring/control system may include one sensor for each tillage point assembly.

While the implement monitoring/control system includes sensor(s) configured to monitor the position(s) of one or more tillage point assemblies in the illustrated embodiment, in other embodiments, the implement monitoring/control system may include sensor(s) configured to monitor the position(s) of other suitable type(s) of ground engaging tool assemblies. For example, in certain embodiments, the agricultural implement may include a disc blade assembly having a shank rotatably coupled to the implement frame and a disc blade rotatably coupled to the shank. In such embodiments, a respective sensor may monitor the position of the disc blade assembly, and the controller may determine whether the disc blade assembly is in the working position or the deflected position. Accordingly, while the implement monitoring/control system described herein is used to monitor and/or control the position(s) of one or more tillage point assemblies, in other embodiments, the implement monitoring/control system may be utilized to monitor and/or control the position(s) of one or more other suitable ground engaging tool assemblies (e.g., of a tillage implement or another suitable type of implement, such as a planting implement, a seeding implement, or a harvesting implement).

While the illustrated agricultural implement includes the disc blades 26, the tillage point assemblies 28, and the finishing discs 30, in other embodiments, the agricultural implement may include other and/or additional ground engaging tool assemblies (e.g., leveling discs configured to size clods and/or smooth the field surface, etc.). Furthermore, while the agricultural implement is towed by a work vehicle in the illustrated embodiment, in other embodiments, the agricultural implement may be self-propelled. In such embodiments, the implement monitoring/control system may output the signal(s) indicative of speed adjustment to a speed control system of the self-propelled agricultural implement.

Figure 2:
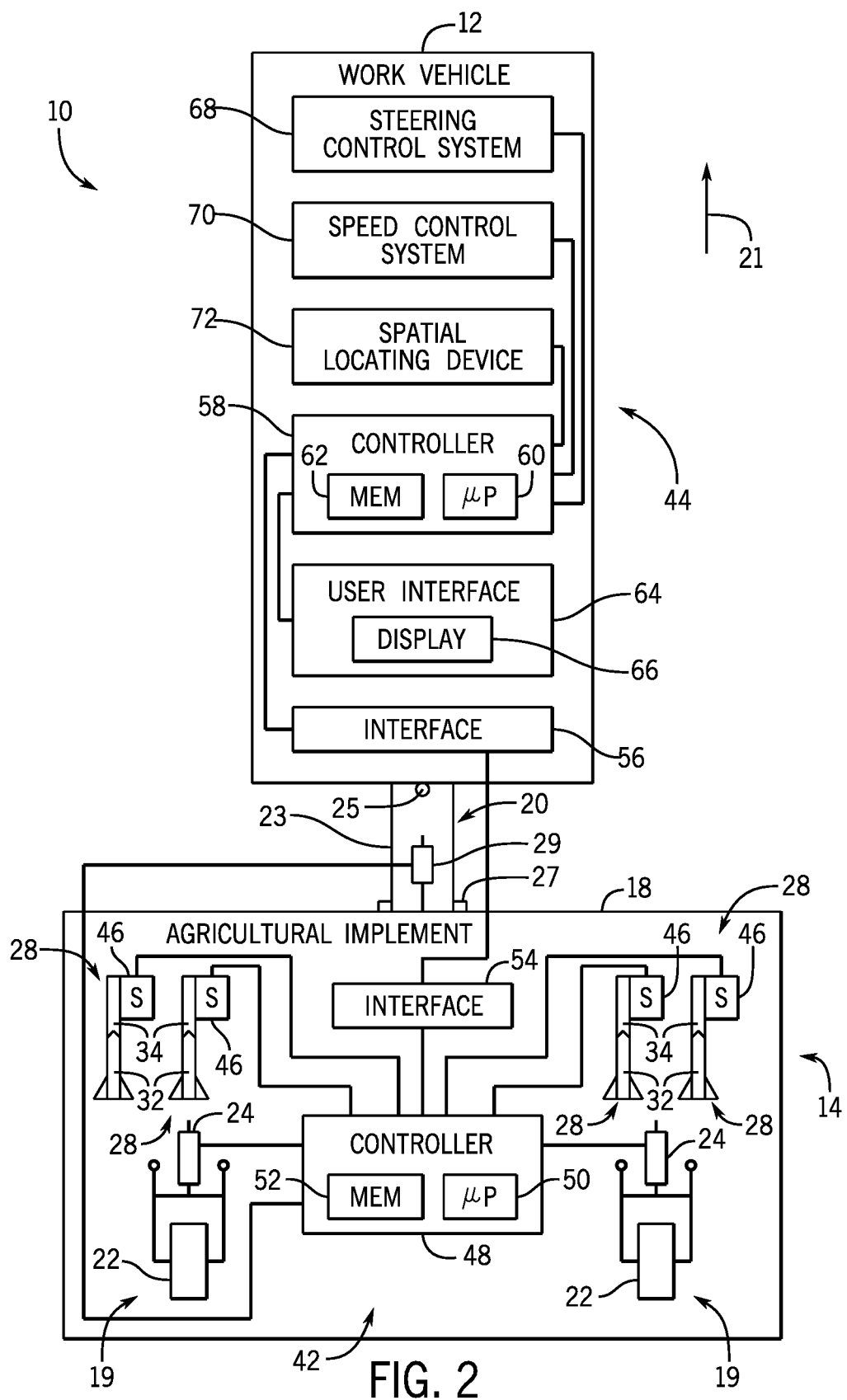
FIG. 2 is a block diagram of an embodiment of an agricultural system having a work vehicle and an agricultural implement.

FIG. 2 is a block diagram of an embodiment of an agricultural system 10 having a work vehicle 12 and an agricultural implement 14. In the illustrated embodiment, the agricultural implement 14 includes the tillage point assemblies 28. However, in other embodiments, the agricultural implement 14 may include one or more disc blades, one or more finishing discs, other suitable ground engaging tool(s) or a combination thereof. The agricultural implement 14 also includes the implement monitoring/control system 42 configured to monitor and, in certain embodiments, control the position of the tillage point assemblies. In the illustrated embodiment, the implement monitoring/control system 42 includes a controller 48 communicatively coupled to the wheel actuators 24, the hitch actuator 29, and the sensors 46.

In certain embodiments, the controller 48 is an electronic controller having electrical circuitry configured to process data from the sensors 46 and to output instructions to the work vehicle control/monitoring system 44, to the wheel actuators 24, to the hitch actuator 29, or a combination thereof. In the illustrated embodiment, the controller 48 includes a processor, such as the illustrated microprocessor 50, and a memory device 52. The controller 48 may also include one or more storage devices and/or other suitable components. The processor 50 may be used to execute software, such as software for controlling the wheel actuators 24 and/or the hitch actuator 29 of the implement monitoring/control system 42, software for controlling the work vehicle monitoring/control system 44, and so forth. Moreover, the processor 50 may include multiple microprocessors, one or more "general-purpose" microprocessors, one or more special-purpose microprocessors, one or more application specific integrated circuits (ASICS), and/or one or more field-programmable gate arrays (FPGA), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the wheel actuators 24 and/or the hitch actuator 29 of the implement monitoring/control system 42, instructions for controlling the work vehicle monitoring/control system 44, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., one or more threshold values, etc.), instructions (e.g., software or firmware for controlling the actuator(s), etc.), and any other suitable data.

In certain embodiments, the implement monitoring/control system controller 48 is configured to determine whether each tillage point assembly is in the working position or the deflected positioned based on feedback (e.g., measured position) from a respective sensor 46. As previously discussed, in certain embodiments, the deflected position corresponds to any position of the tillage point assembly that is more than a threshold distance from the working position (e.g., at which the tillage point of the tillage point assembly is positioned at the target depth). Accordingly, the implement monitoring/control system controller 48 may determine that a tillage point assembly is in the deflected position in response to determining that a difference between the measured position and the working position is greater than a threshold value.

In response to determining that at least one tillage point assembly is in the deflected position, the implement monitoring/control system controller 48 may output a monitoring signal indicative of the at least one tillage point assembly being in the deflected position. In the illustrated embodiment, the controller 48 is configured to output the monitoring signal to the work vehicle monitoring/control system 44 via an interface 54. As illustrated, the interface 54 is communicatively coupled to the controller 48 and to a corresponding interface 56 of the work vehicle monitoring/control system 44. The interface 56 of the work vehicle monitoring/control system 44, in turn, is communicatively coupled to a controller 58 of the work vehicle monitoring/control system 44. The interfaces may be communicatively coupled to one another by any suitable connection, such as a wireless connection or a wired connection. In addition, the interfaces may communicate with one another using any suitable communication protocol, such as a standard communication protocol (e.g., CAN bus, ISOBUS, etc.) or a proprietary protocol.

In certain embodiments, the controller 58 is an electronic controller having electrical circuitry configured to process data from the interface 56 and to output instructions to other components of the work vehicle monitoring/control system 44. In the illustrated embodiment, the controller 58 includes a processor, such as the illustrated microprocessor 60, and a memory device 62. The controller 58 may also include one or more storage devices and/or other suitable components. The processor 60 may be used to execute software, such as software for controlling one or more components of the work vehicle monitoring/control system 44, and so forth. Moreover, the processor 60 may include multiple microprocessors, one or more "general-purpose" microprocessors, one or more special-purpose microprocessors, and/or one or more application specific integrated circuits (ASICS), or some combination thereof. For example, the processor 60 may include one or more reduced instruction set (RISC) processors.

The memory device 62 may include a volatile memory, such as random access memory (RAM), and/or a nonvolatile memory, such as read-only memory (ROM). The memory device 62 may store a variety of information and may be used for various purposes. For example, the memory device 62 may store processor-executable instructions (e.g., firmware or software) for the processor 60 to execute, such as instructions for controlling one or more components of the work vehicle monitoring/control system 44, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling work vehicle monitoring/control system components, etc.), and any other suitable data.

In the illustrated embodiment, the work vehicle monitoring/control system 44 includes a user interface 64 communicatively coupled to the controller 58. The user interface 64 is configured to provide input to the controller 58 and to receive output from the controller 58. As illustrated, the user interface 64 includes a display 66. The display 66 is configured to present information to an operator. In certain embodiments, the display 66 may be a touch screen display configured to receive input from the operator. The user interface 64 may also include other input devices (e.g., keyboard, mouse, switches, buttons, etc.) configured to receive input from the operator.

In certain embodiments, the user interface 64 is configured to receive the monitoring signal from the implement monitoring/control system controller 48 (e.g., via the first interface 54, the second interface 56, and the work vehicle monitoring/control system controller 58). Accordingly, the user interface 64 (e.g., the display 66 of the user interface 64) may present an indication indicative of at least one tillage point assembly being in the deflected position in response to receiving the monitoring signal. For example, the display 66 may present a visual representation of each tillage point assembly and an indication of whether the tillage point assembly is in the deflected position. By way of example, the display 66 may present the tillage point assembly in a first color if the tillage point assembly is in the working position and a second color if the tillage point assembly is in the deflected position. Furthermore, in certain embodiments, the implement monitoring/control system controller 48 may output a signal indicative of the measured position of each tillage point assembly. In such embodiments, the display 66 of the user interface 64 may present an indication indicative of the measured position of each tillage point assembly (e.g., a numerical value of the distance between the working position and the measured position, etc.).

In certain embodiments, the controller 48 is configured to determine that each tillage point assembly is in a second deflected position in response to determining that the difference between the measured position and the working position is greater than a second threshold value, greater than the threshold value. For example, the second threshold value may be 2 cm, 4 cm, 7 cm, 10 cm, or 15 cm. The implement monitoring/control system controller 48 is configured to output a second monitoring signal indicative of the tillage point assembly being in the second deflected position, and the user interface 64 is configured to receive the second monitoring signal (e.g., via the first interface 54, the second interface 56, and the work vehicle monitoring/control system controller 58). The user interface 64 (e.g., the display 66 of the user interface 64) is configured to present the indication indicative of the tillage point assembly being in the deflected position in response to receiving the monitoring signal, and the user interface 64 (e.g., the display 66 of the user interface) is configured to present an indication indicative of the tillage point assembly being in the second deflected position in response to receiving the second monitoring signal. For example, the display 66 may present the tillage point assembly in green if the difference between the measure position and the working position is less than or equal to the threshold value, the display 66 may present the tillage point assembly in yellow if the difference between the measured position and the working position is greater than the threshold value and less than or equal to the second threshold value, and the display 66 may present the tillage point assembly in red if the difference between the measured position and the working position is greater than the second threshold value.

In the illustrated embodiment, the work vehicle monitoring/control system 44 includes a steering control system 68 and a speed control system 70. As illustrated, the steering control system 68 and the speed control system 70 are communicatively coupled to the controller 58. In certain embodiments, the steering control system 68 may include a wheel angle control system, a differential braking system, a differential wheel speed system, or a combination thereof. The wheel angle control system may automatically rotate one or more wheels and/or tracks of the work vehicle (e.g., via hydraulic actuators) to steer the work vehicle along a target route (e.g., along guidance swaths, along turns between guidance swaths, etc.). By way of example, the wheel angle control system may rotate front wheels/tracks, rear wheels/tracks, intermediate wheels/tracks, or a combination thereof, of the work vehicle (e.g., either individually or in groups). In certain embodiments, the work vehicle includes a front portion having front wheel/tracks and a rear portion having rear wheels/tracks, in which the front and rear portions of the work vehicle are coupled to one another by a pivot joint, thereby forming an articulated work vehicle. In such embodiments, the wheel angle control system may rotate the rear portion of the work vehicle relative to the front portion to steer the work vehicle along the target route. The differential braking system may independently vary the braking force on each lateral side of the work vehicle to direct the work vehicle along a path. In addition, the differential wheel speed system may independently control the speed of wheel(s) and/or track(s) on each lateral side of the work vehicle, thereby directing the work vehicle along a path. For example, if the work vehicle includes one track on each lateral side of the work vehicle, the differential wheel speed system may control the direction of the work vehicle by adjusting the speed of each track. In addition, if the work vehicle includes at least one driven wheel on each lateral side of the work vehicle (e.g., a front driven wheel and a rear non-driven wheel, such as a caster wheel), the differential wheel speed system may control the direction of the work vehicle by adjusting the speed of each driven wheel. In further embodiments, the steering control system may include other and/or additional systems to facilitate directing the work vehicle along a path through the field.

In certain embodiments, the speed control system 70 may include an engine output control system, a transmission control system, a braking control system, or a combination thereof. The engine output control system may vary the output of the engine to control the speed of the work vehicle.

For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the work vehicle. Furthermore, the braking control system may adjust braking force, thereby controlling the speed of the work vehicle. In further embodiments, the speed control system may include other and/or additional systems to facilitate adjusting the speed of the work vehicle.

In the illustrated embodiment, the work vehicle monitoring/control system 44 includes a spatial locating device 72 communicatively coupled to the work vehicle controller 58. The spatial locating device 72 is configured to output a signal indicative of a position, and in certain embodiments a velocity, of the work vehicle 12. The spatial locating device 72 may include any suitable system configured to measure and/or facilitate determination of the position of the work vehicle 12, such as a GPS receiver, for example. The spatial locating device 72 may output the signal indicative of the position/velocity of the work vehicle 12 to the agricultural implement monitoring/control system controller 48 (e.g., via the work vehicle monitoring/control system controller 58, the work vehicle interface 56, and the agricultural implement interface 54).

In certain embodiments, the agricultural implement monitoring/control system controller 48 may output a first control signal indicative of instructions to adjust the speed of the agricultural system based on the measured position of one or more ground engaging tool assemblies (e.g., one or more tillage point assemblies). For example, in response to determining that at least one tillage point assembly 28 is in the deflected position, the implement monitoring/control system controller 48 may output the first control signal to the speed control system 70 (e.g., via the agricultural implement interface 54, the work vehicle interface 56, and the work vehicle monitoring/control system controller 58) indicative of instructions to reduce a speed of the agricultural system 10. Reducing the speed of the agricultural system reduces the resistance provided by the soil. As such, each deflected tillage point assembly may return to the working position in response to reducing the speed of the agricultural system. For example, the spring may drive the deflected tillage point assembly to the working position in response to the reduction in the speed of the agricultural system.

Furthermore, in certain embodiments, the implement monitoring/control system controller 48 may output a second control signal indicative of instructions to adjust the position of at least one ground engaging tool (e.g., tillage point assembly) based on the measured position of the at least one ground engaging tool. For example, in response to determining that at least one tillage point assembly 28 is in the deflected position, the implement monitoring/control system controller 48 may output the second control signal to the hitch actuator 29 and/or to the wheel actuators 24 indicative of instructions to adjust the position of the implement frame relative to the soil surface, thereby adjusting the penetration depth of the tillage point assemblies. In certain embodiments, the controller 48 may output the second output signal to the hitch actuator 29 and/or to the wheel actuators 24 indicative of instructions to raise the tillage point assemblies to a target raised position to reduce the penetration depth of the tillage point assemblies. With the tillage point assemblies in the target raised position, the resistance provided by the soil may be substantially reduced. As such, each deflected tillage point assembly may return to the working position in response to raising the tillage point assemblies to the target raised position. For example, the spring may drive a deflected tillage point assembly to the working position in response to raising the tillage point assembly to the target raised position.

In certain embodiments, the implement monitoring/control system controller 48 is configured to output the second control signal to the hitch actuator 29 and to the wheel actuators 24 to control the penetration depth of the tillage point assemblies 28. However, in other embodiments, the implement monitoring/control system controller may be configured to output the second control signal to one or more other suitable actuators to control the penetration depth of at least one ground engaging tool. For example, in certain embodiments, the hitch assembly may be coupled to the wheel assemblies by a mechanical linkage. Accordingly, a single actuator may control both the position of the hitch and the position of the wheel assemblies along the vertical axis. In such embodiments, the controller may output the second control signal to the single actuator to control the penetration depth of the tillage point assemblies. Furthermore, in certain embodiments, the hitch actuator may be omitted, and the hitch frame may freely move (e.g., rotate) relative to the implement frame. In such embodiments, the agricultural implement may include one or more forward wheel assemblies (e.g., one or more gauge wheel assemblies), and an actuator may extend from the implement frame to each respective forward wheel assembly. Accordingly, the implement monitoring/control system controller may output the second control signal to each wheel actuator to control the penetration depth of the tillage point assemblies.

Furthermore, in certain embodiments, the implement monitoring/control system controller, in response to determining that at least one ground engaging tool assembly is in the deflected position, may instruct one or more actuators to move certain ground engaging tool assemblies without changing the position of other ground engaging tool assemblies. For example, the implement monitoring/control system controller, in response to determining that at least one tillage point assembly is in the deflected position, may instruct the hitch actuator 29 and/or the wheel actuators 24 to tilt the implement frame about a lateral axis of the agricultural implement, thereby reducing the penetration depth of one or more forward tillage point assemblies or reducing the penetration depth of one or more rearward tillage point assemblies. For example, in certain embodiments, the implement monitoring/control system controller, in response to determining that a rearward tillage point assembly is in the deflected position, may instruct the hitch actuator and/or the wheel actuators to raise the rear portion of the implement frame, thereby moving the rearward tillage point assembly to the target raised position. In addition, the controller may adjust the penetration depth of one or more individual ground engaging tool assemblies in response to determining that the ground engaging tool assembly is in the deflected position. For example, actuators may be coupled to certain tillage point assemblies, in which each actuator is configured to control the position of a respective tillage point assembly relative to the implement frame. In certain embodiments, the implement monitoring/control system controller, in response to determining that a particular tillage point assembly is in the deflected position, may instruct the respective actuator to move the tillage point assembly to the target raised position.

In response to the tillage point assemblies returning to the working position, the implement monitoring/control system controller may output a control signal indicative of instructions to adjust the speed of the agricultural system to the original speed (e.g., in embodiments in which the speed is reduced in response to deflection of at least one tillage point assembly). Additionally or alternatively, the implement monitoring/control system controller may output a control signal indicative of instructions to adjust the penetration depth of the tillage point assemblies to the target penetration depth (e.g., in embodiments in which the penetration depth of the tillage point assemblies is reduced in response to deflection of at least one tillage point assembly). Accordingly, the agricultural implement may return to normal operation in response to the tillage point assemblies returning to the working position.

In certain embodiments, the implement monitoring/control system controller may only determine that a tillage point assembly is in the deflected position if the difference between the measured position and the working positioned exceeds the threshold value for longer than a threshold duration. For example, the threshold duration may be 0.5 seconds, 1 second, 2 seconds, 3 seconds, 4 seconds, or 5 seconds. Accordingly, the implement monitoring/control system controller may not output the monitoring signal and/or the control signal(s) until the tillage point assembly is deflected for longer than the threshold duration. As a result, the monitoring signal and/or the control signal(s) may not be output if the tillage point assembly is transiently deflected during an encounter with an obstruction.

While the ground engaging tool monitoring and control process described above is controlled by the implement monitoring/control system controller 48 in the illustrated embodiment, in other embodiments, the ground engaging tool monitoring and control process may be controlled by the work vehicle monitoring/control system controller 58 or a combination of the implement monitoring/control system controller 48 and the work vehicle monitoring/control system controller 58. In such embodiments, the implement monitoring/control system may include the vehicle monitoring/control system controller. Furthermore, in certain embodiments, the agricultural implement may be self-propelled. In such embodiments, the elements communicatively coupled to the work vehicle monitoring/control system controller (e.g., the steering control system, the speed control system, the spatial locating device, and the user interface) may be communicatively coupled to the implement monitoring/control system controller (e.g., and the interfaces may be omitted). In such embodiments, the implement monitoring/control system controller may control the speed of the agricultural implement via the speed control system, and the implement monitoring/control system controller may provide output to and receive input from the user interface. In addition, in certain embodiments, the user interface may be positioned remote from the work vehicle (e.g., in embodiments in which the agricultural system is controlled by a remote operator).

Figure 3:
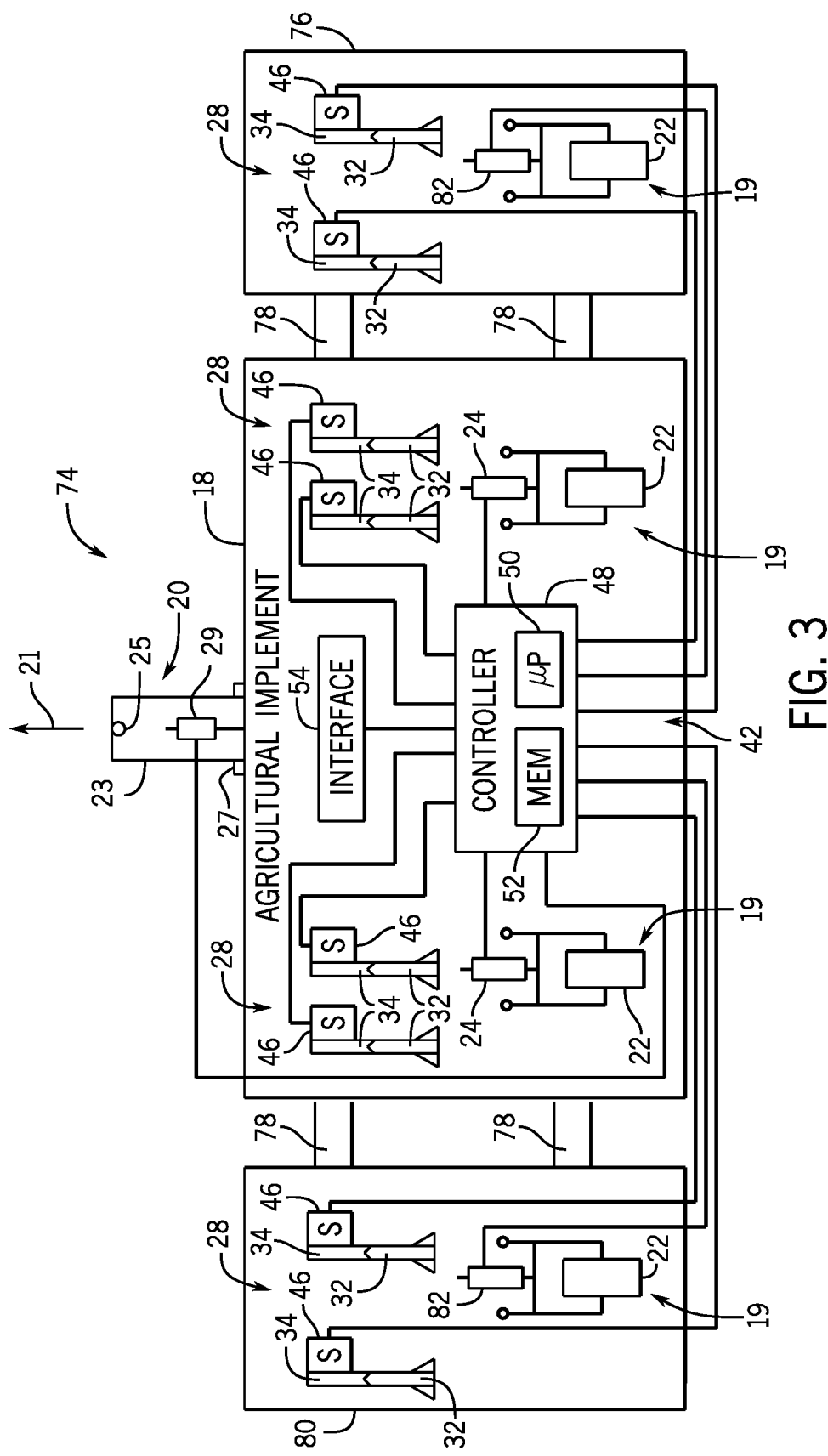
FIG. 3 is a block diagram of another embodiment of an agricultural implement having wing frames rotatably coupled to an implement frame.

FIG. 3 is a block diagram of another embodiment of an agricultural implement 74 having wing frames rotatably coupled to the implement frame 18. In the illustrated embodiment, the agricultural implement 74 includes a first wing frame 76 pivotally coupled to the implement frame 18 by one or more pivot joints 78. The pivot joints 78 enable the first wing frame 76 to pivot about a longitudinal axis of the agricultural implement (e.g., parallel to the direction of travel 21) relative to the implement frame 18, thereby enabling the first wing frame 76 to follow contours of the soil surface. Furthermore, the agricultural implement 74 includes a second wing frame 80 pivotally coupled to the implement frame 18 by one or more pivot joints 78. As illustrated, the second wing frame 80 is positioned on the opposite lateral side of the implement frame from the first wing frame. The pivot joints 78 enable the second wing frame 80 to pivot about the longitudinal axis of the agricultural implement relative to the implement frame 18, thereby enabling the second wing frame 80 to follow contours of the soil surface.

Furthermore, the first wing frame 76 supports a group of ground engaging tool assemblies, such as the illustrated tillage point assemblies 28, and the second wing frame 80 supports a group of ground engaging tool assemblies, such as the illustrated tillage point assemblies 28. Each wing frame may support the same type(s) of ground engaging tool assemblies as the implement frame, or at least one wing frame may support different type(s) of ground engaging tool assemblies from the implement frame. In addition, at least one wheel assembly 19 is movably coupled to each wing frame. In certain embodiments, each wheel assembly includes a wheel frame pivotally coupled to the wing frame and a wheel 22 rotatably coupled to the wheel frame. While the agricultural implement has two wing frames in the illustrated embodiment, in other embodiments, the agricultural implement may include more or fewer wing frames. For example, the agricultural implement may include a single wing frame positioned on one lateral side of the implement frame. In addition, the agricultural implement may include multiple wing frames on at least one lateral side of the implement frame (e.g., in which at least two of the wing frames are pivotally coupled to one another by respective pivot joint(s)).

In the illustrated embodiment, the implement monitoring/control system 42 also includes sensors 46 coupled to each wing frame. Each sensor 46 is configured to emit an output signal toward a respective tillage point assembly 28 and to receive a return signal indicative of a measured position of the tillage point assembly 28 relative to the wing frame. As illustrated, the sensors 46 are communicatively coupled to the controller 48 of the implement monitoring/control system 42, and the implement monitoring/control system controller 48 is configured to determine whether each tillage point assembly is in the working position or the deflected positioned based on feedback from a respective sensor. In certain embodiments, the implement monitoring/control system controller 48 is configured to determine that a tillage point assembly is in the deflected position in response to determining that a difference between the measured position and the working position is greater than the threshold value. In addition, the implement monitoring/control system controller 48 may output a monitoring signal to the user interface of the work vehicle monitoring/control system indicative of the tillage point assembly being in the deflected position. The user interface, in turn, may present an indication indicative of the tillage point assembly being in the deflected position in response to receiving the monitoring signal.

Furthermore, in certain embodiments, the implement monitoring/control system controller 48 may output a control signal (e.g., second control signal) indicative of instructions to adjust the position of at least one ground engaging tool assembly (e.g., tillage point assembly) on a wing frame based on the measured position of the at least one ground engaging tool on the wing frame and/or the measured position of at least one ground engaging tool on the implement frame. For example, in response to determining that at least one tillage point assembly 28 on the implement frame is in the deflected position, the implement monitoring/control system controller 48 may output the control signal to the wing wheel actuators 82 indicative of instructions to adjust the position of the wing frames relative to the soil surface, thereby adjusting the penetration depth of the ground engaging tool assemblies (e.g., tillage point assemblies) on the wing frames (e.g., to the target raised position). Additionally or alternatively, in response to determining that at least one tillage point assembly 28 on one wing frame is in the deflected position, the implement monitoring/control system controller 48 may output the control signal to the respective wing wheel actuator 82 indicative of instructions to adjust the position of the wing frame relative to the soil surface, thereby adjusting the penetration depth of the ground engaging tool assemblies (e.g., tillage point assemblies) on the wing frame (e.g., to the target raised position and/or without adjusting the penetration depth of the ground engaging tool assemblies on the implement frame).

As illustrated, each wing wheel actuator 82 is coupled to the respective wing frame and to the respective wheel assembly, and each wing wheel actuator 82 is configured to control a wheel assembly position of the respective wheel assembly relative to the respective wing frame along the vertical axis. In certain embodiments, the implement monitoring/control system controller may output the control signal to the wing wheel actuator 82 indicative of instructions to raise the ground engaging tool assemblies to the target raised position to reduce the penetration depth of the ground engaging tool assemblies. With the ground engaging tool assemblies in the target raised position, the resistance provided by the soil may be substantially reduced. As such, each deflected ground engaging tool assembly may return to the working position in response to raising the ground engaging tool assemblies to the target raised position (e.g., raising the wing frame of the agricultural implement upwardly along the vertical axis relative to the soil surface). For example, the spring may drive a deflected ground engaging tool assembly to the working position in response to raising the ground engaging tool assembly to the target raised position. Furthermore, in response to the ground engaging tool assemblies returning to the working position, the implement monitoring/control system controller may output a control signal indicative of instructions to adjust the penetration depth of the ground engaging tool assemblies to the target penetration depth. Accordingly, the agricultural implement may return to normal operation in response to the ground engaging tool assemblies returning to the working positions.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising:
   a frame;
   a ground engaging tool assembly comprising a shank rotatably coupled to the frame and a ground engaging tool coupled to the shank, wherein the ground engaging tool is configured to engage soil;
   a biasing element coupled to the frame and to the shank, wherein the biasing element is configured to urge the ground engaging tool assembly toward a working position;
   a monitoring system, comprising:
      a sensor mounted to one of the frame or the ground engaging tool assembly and directed toward a target, wherein the target is the other of the frame or the ground engaging tool assembly, and the sensor is configured to emit an output signal toward the target and to receive a return signal indicative of a measured position of the ground engaging tool assembly relative to the frame; and
      a controller communicatively coupled to the sensor, wherein the controller comprises a memory and a processor, the controller is configured to determine that the ground engaging tool assembly is in a deflected position in response to determining that a difference between the measured position and the working position is greater than a threshold value, the controller is configured to output a monitoring signal indicative of the ground engaging tool assembly being in the deflected position, and the controller is configured to output a position control signal indicative of instructions to adjust a frame position of the frame based on the measured position.

2. The agricultural implement of claim 1, wherein the monitoring system comprises a user interface communicatively coupled to the controller, the user interface is configured to present a first indication indicative of the ground engaging tool assembly being in the deflected position in response to receiving the monitoring signal, to present a second indication indicative of the measured position of the ground engaging tool assembly, or a combination thereof.

3. The agricultural implement of claim 2, wherein the controller is configured to determine that the ground engaging tool assembly is in a second deflected position in response to determining that the difference between the measured position and the working position is greater than a second threshold value, greater than the threshold value, the controller is configured to output a second monitoring signal indicative of the ground engaging tool assembly being in the second deflected position, and the user interface is configured to present a third indication indicative of the ground engaging tool assembly being in the second deflected position in response to receiving the second monitoring signal.

4. The agricultural implement of claim 1, wherein the sensor comprises an infrared sensor, a radio detection and ranging sensor, a lidar sensor, an ultrasonic sensor, or a capacitive sensor.

5. The agricultural implement of claim 1, comprising:
   a second ground engaging tool assembly comprising a second shank rotatably coupled to the frame and a second ground engaging tool coupled to the second shank, wherein the second ground engaging tool is configured to engage the soil; and
   a second biasing element coupled to the frame and to the second shank, wherein the second biasing element is configured to urge the second ground engaging tool assembly toward a second working position.

6. The agricultural implement of claim 5, wherein the monitoring system comprises a second sensor mounted to one of the frame or the second ground engaging tool assembly and directed toward a second target, the second target is the other of the frame or the second ground engaging tool assembly, the second sensor is configured to emit a second output signal toward the target and to receive a second return signal indicative of a second measured position of the second ground engaging tool assembly relative to the frame, the controller is communicatively coupled to the second sensor, the controller is configured to determine that the second ground engaging tool assembly is in a second deflected position in response to determining that a difference between the second measured position and the second working position is greater than a second threshold value, and the controller is configured to output a second monitoring signal indicative of the second ground engaging tool assembly being in the second deflected position.

7. The agricultural implement of claim 1, wherein the controller is configured to output the position control signal indicative of instructions to raise the frame position of the frame in response to determining the ground engaging tool assembly is in the deflected position, such that the ground engaging tool of the ground engaging tool assembly is positioned at a target raised position while the ground engaging tool assembly is in the working position.

8. An agricultural implement, comprising:
a frame;
a ground engaging tool assembly comprising a shank rotatably coupled to the frame and a ground engaging tool coupled to the shank, wherein the ground engaging tool is configured to engage soil;
a biasing element coupled to the frame and to the shank, wherein the biasing element is configured to urge the ground engaging tool assembly toward a working position;
a control system, comprising:
a sensor mounted to one of the frame or the ground engaging tool assembly and directed toward a target, wherein the target is the other of the frame or the ground engaging tool assembly, and the sensor is configured to emit an output signal toward the target and to receive a return signal indicative of a measured position of the ground engaging tool assembly relative to the frame; and
a controller communicatively coupled to the sensor, wherein the controller comprises a memory and a processor, and the controller is configured to output a position control signal indicative of instructions to adjust a frame position of the frame based on the measured position.

9. The agricultural implement of claim 8, wherein the sensor comprises an infrared sensor, a radio detection and ranging sensor, a lidar sensor, an ultrasonic sensor, or a capacitive sensor.

10. The agricultural implement of claim 8, comprising:
a second ground engaging tool assembly comprising a second shank rotatably coupled to the frame and a second ground engaging tool coupled to the second shank, wherein the second ground engaging tool is configured to engage the soil; and
a second biasing element coupled to the frame and to the second shank, wherein the second biasing element is configured to urge the second ground engaging tool assembly toward a second working position;
wherein the control system comprises a second sensor mounted to one of the frame or the second ground engaging tool assembly and directed toward a second target, the second target is the other of the frame or the second ground engaging tool assembly, the second sensor is configured to emit a second output signal toward the target and to receive a second return signal indicative of a second measured position of the second ground engaging tool assembly relative to the frame, the controller is communicatively coupled to the second sensor, and the controller is configured to output a speed control signal indicative of instructions to adjust a speed of the agricultural implement based on the measured position and the second measured position, to output the position control signal indicative of instructions to adjust the frame position based on the measured position and the second measured position, or a combination thereof.

11. The agricultural implement of claim 8, wherein the controller is configured to determine that the ground engaging tool assembly is in a deflected position in response to determining that a difference between the measured position and the working position is greater than a threshold value, and the controller is configured to output the position control signal indicative of instructions to raise the frame position of the frame in response to determining the ground engaging tool assembly is in the deflected position, such that the ground engaging tool of the ground engaging tool assembly is positioned at a target raised position while the ground engaging tool assembly is in the working position.

12. An agricultural implement, comprising:
an implement frame;
a ground engaging tool assembly comprising a shank rotatably coupled to the implement frame and a ground engaging tool coupled to the shank, wherein the ground engaging tool is configured to engage soil;
a biasing element coupled to the implement frame and to the shank, wherein the biasing element is configured to urge the ground engaging tool assembly toward a working position;
a wheel assembly movably coupled to the implement frame;
a control system, comprising:
a sensor mounted to one of the implement frame or the ground engaging tool assembly and directed toward a target, wherein the target is the other of the implement frame or the ground engaging tool assembly, the sensor is configured to emit an output signal toward the target and to receive a return signal indicative of a measured position of the ground engaging tool assembly relative to the implement frame;
an actuator coupled to the wheel assembly, wherein the actuator is configured to control a vertical position of a wheel of the wheel assembly relative to the implement frame;
a controller communicatively coupled to the sensor and to the actuator, wherein the controller comprises a memory and a processor, and the controller is configured to output a first control signal to the actuator indicative of instructions to adjust the vertical position of the wheel based on the measured position.

13. The agricultural implement of claim 12, wherein the controller is configured to output a second control signal indicative of instructions to adjust a speed of the agricultural implement based on the measured position.

14. The agricultural implement of claim 12, wherein the controller is configured to determine that the ground engaging tool assembly is in a deflected position in response to determining that a difference between the measured position and the working position is greater than a threshold value, and the controller is configured to output a monitoring signal indicative of the ground engaging tool assembly being in the deflected position.

15. The agricultural implement of claim 14, wherein the control system comprises a user interface communicatively coupled to the controller, and the user interface is configured to present a first indication indicative of the ground engaging tool assembly being in the deflected position in response to receiving the monitoring signal, to present a second indication indicative of the measured position of the ground engaging tool assembly, or a combination thereof.

16. The agricultural implement of claim 15, wherein the controller is configured to determine that the ground engaging tool assembly is in a second deflected position in response to determining that the difference between the measured position and the working position is greater than a second threshold value, greater than the threshold value, the controller is configured to output a second monitoring signal indicative of the ground engaging tool assembly being in the second deflected position, and the user interface is configured to present a third indication indicative of the ground engaging tool assembly being in the second deflected position in response to receiving the second monitoring signal.

17. The agricultural implement of claim 12, wherein the sensor comprises an infrared sensor, a radio detection and ranging sensor, a lidar sensor, an ultrasonic sensor, or a capacitive sensor.

18. The agricultural implement of claim 12, comprising:
a second ground engaging tool assembly comprising a second shank rotatably coupled to the implement frame and a second ground engaging tool coupled to the second shank, wherein the second ground engaging tool is configured to engage the soil; and
a second biasing element coupled to the implement frame and to the second shank, wherein the second biasing element is configured to urge the second ground engaging tool assembly toward a second working position;
wherein the control system comprises a second sensor mounted to one of the implement frame or the second ground engaging tool assembly and directed toward a target, the target is the other of the implement frame or the second ground engaging tool assembly, the second sensor is configured to emit a second output signal toward the target and to receive a second return signal indicative of a second measured position of the second ground engaging tool assembly relative to the implement frame, the controller is communicatively coupled to the second sensor, and the controller is configured to output the first control signal to the actuator indicative of instructions to adjust the vertical position of the wheel based on the measured position and the second measured position.

19. The agricultural implement of claim 12, comprising:
a wing frame pivotally coupled to the implement frame; and
a second wheel assembly movably coupled to the wing frame;
wherein the control system comprises a second actuator coupled to the second wheel assembly, and the second actuator is configured to control a vertical position of a wheel of the second wheel assembly relative to the wing frame; and
wherein the controller is communicatively coupled to the second actuator, and the controller is configured to output the first control signal to the second actuator indicative of instructions to adjust the vertical position of the wheel of the second wheel assembly based on the measured position.

20. The agricultural implement of claim 12, wherein the controller is configured to determine that the ground engaging tool assembly is in a deflected position in response to determining that a difference between the measured position and the working position is greater than a threshold value, and the controller is configured to output the first control signal indicative of instructions to lower the vertical position of the wheel in response to determining the ground engaging tool assembly is in the deflected position, such that the ground engaging tool of the ground engaging tool assembly is positioned at a target raised position while the ground engaging tool assembly is in the working position.

* * * * *